United States Patent [19]

Kutsumi et al.

[11] Patent Number: 5,353,221

[45] Date of Patent: Oct. 4, 1994

[54] TRANSLATION MACHINE CAPABLE OF TRANSLATING SENTENCE WITH AMBIGUOUS PARALLEL DISPOSITION OF WORDS AND/OR PHRASES

[75] Inventors: Takeshi Kutsumi, Yamato-Koriyama; Yoji Fukumochi, Ikoma; Shuzo Kugimiya, Nara; Ichiko Sata, Nara; Tokuyuki Hirai, Nara, all of Japan

[73] Assignee: Sharp Kabushiki Kaisha, Osaka, Japan

[21] Appl. No.: 819,223

[22] Filed: Jan. 10, 1992

[30] Foreign Application Priority Data

Jan. 11, 1991 [JP] Japan .................................. 3-002114

[51] Int. Cl.$^5$ .............................................. G06F 15/38
[52] U.S. Cl. ............................ 364/419.05; 364/419.02
[58] Field of Search ................ 364/419, 200 MS File, 364/900 MS File

[56] References Cited

U.S. PATENT DOCUMENTS

| | | | |
|---|---|---|---|
| 4,821,230 | 4/1989 | Kumano et al. | 364/419 |
| 4,833,611 | 5/1989 | Fukumochi et al. | |
| 4,894,779 | 1/1990 | Suzuki et al. | 364/419 |
| 4,962,452 | 10/1990 | Nogami et al. | 364/419 |
| 5,001,633 | 3/1991 | Fukumochi et al. | 364/419 |
| 5,005,127 | 4/1991 | Kugimiya et al. | 364/419 |
| 5,010,486 | 4/1991 | Suzuki et al. | 364/419 |

FOREIGN PATENT DOCUMENTS 3-45423  7/1991  Japan .

*Primary Examiner*—Roy N. Envall, Jr.
*Assistant Examiner*—Frantzy Poinvil
*Attorney, Agent, or Firm*—David G. Conlin; Kevin J. Fournier

[57] ABSTRACT

A translation machine capable of translating a sentence in a source language with an ambiguous parallel disposition of words and/or phrases into an accurate sentence in a target language includes a unit (151) for looking-up dictionaries and for analyzing morphological of the sentence in the source language input to the translation machine so as to provide a part of speech of the analyzed morphological, a unit (152) connected to the dictionary look up and morphological analyzing unit (151) for analyzing a syntactic of the sentence based on the obtained parts of speech of the morphological by using grammatical rules stored in the dictionary look up and morphological analyzing unit (151), a unit (153) connected to the syntactic analyzing unit (152) for transforming the analyzed syntactic into a syntactic in a target language, and a unit (154) connected to the transforming unit (153) for generating a translated sentence in the target language in accordance with the transformed syntactic in the target language.

8 Claims, 11 Drawing Sheets

```
 0     1  2  3      4
This is a pen
```

| 0 | 1 | 2 | 3 | 4 | 5 | 6 | 7 | 8 | 9 | 10 | 11 | 12 | 13 | 14 | 15 | 16 |

He played cards in nS_[the room], [the yard], and E [the garage] of his house.

TRANSLATION MACHINE CAPABLE OF TRANSLATING SENTENCE WITH AMBIGUOUS PARALLEL DISPOSITION OF WORDS AND/OR PHRASES

BACKGROUND OF THE INVENTION

1. Field of the Invention

The present invention relates to a translation machine for outputting a natural translated sentence, more particularly the translation machine which is capable of translating a sentence with an ambiguous parallel disposition of words and/or phrases into a correct sentence.

2. Description of the Related Art

The inventors of the present invention know a translation machine which is operated to enter a source language input from a keyboard into a translation module under a control of a main central processing unit (CPU). The translation module serves to translate the source language into a target language by using dictionaries and by following rules such as grammatical rules and tree-structure transforming rules stored in a memory.

In a translation operation, a syntactic of the source language is analyzed in the translation module as follows. The words composing one sentence contained in the read source language are stored in a buffer. Using the dictionary stored the memory, the translation module serves to derive a part speech of each word stored in the buffer. Then, proper grammatical rules are picked out of the memory for setting up the modifying relation among the parts of speech of the words. Based on the picked grammar rules, a structure analyzing tree is created for indicating how the words composing the sentence being modified. The syntactic analyzing tree of the source language is transformed into the syntactic analyzing tree of the target language, from which the translated sentence of the target language is created.

When the English sentence of "He played cards in the room, the yard, and the garage of his house." (the source language is herein assumed to be English) is input to the known translation module, the translation module provides no means for determining the parallel disposition of three phrases "the room", "the yard" and "the garage". According to the grammatical rules, therefore, the three phrases of "the room", "the yard" and "the garage of his house" are erroneously determined as parallel disposition. It results in the translation module serving to translate the English sentence into the target-language (herein, Japanese) translated sentence like:

"彼は部屋、中庭、及び彼の家の車庫においてカードをプレイした。"

(translated such that "his house" modifies only "the garage", though in actual "his house modifies all of "the room", "the yard" and "the garage".)

The known translation machine operates to build a syntactic analyzing tree for indicating how the words composing an input source-language sentence being modified by using the grammatical rules and to create the translated sentence of a target language on the basis of the syntactic analyzing tree of the source language. Hence, in case of inputting a sentence whose parallel disposition of the phrases and/or words is ambiguous or whose modifying structure of the words is ambiguous, it may be possible to obtain a plurality of grammatical rule groups from the memory, each grammatical rule group working for defining the modifying relation among the words composing the sentence. In such a case, it is possible to build all the possible syntactic analyzing trees, to obtain a plurality of translated sentences for those syntactic analyzing trees, and to output the obtained translated sentences in a predetermined sequence.

As such, if an operator determines the first output translated sentence of the target language is not proper, he or she gives an indication from the keyboard to the CPU so as to change the translated sentence alternatives in sequence and select the most appropriate one. This operation is very troublesome, because all the translated sentence alternatives are not displayed on a display device such as a cathode ray tube (CRT) simultaneously.

SUMMARY OF THE INVENTION

It is an object of the present invention to provide a translation machine which is capable of translating a sentence in a source language with an ambiguous parallel disposition of words and/or phrases into an accurate sentence in a target language.

The object of the present invention can be achieved by a translation machine capable of translating a sentence in a source language with an ambiguous parallel disposition of words and/or phrases into an accurate sentence in a target language includes a unit for looking-up dictionaries and for analyzing morphological of the sentence in the source language input to the translation machine so as to provide a part of speech of the analyzed morphological, a unit connected to the dictionary look up and morphological analyzing unit for analyzing a syntactic of the sentence based on the obtained parts of speech of the morphological by using grammatical rules stored in the dictionary look up and morphological analyzing unit, a unit connected to the syntactic analyzing unit for transforming the analyzed syntactic into a syntactic in a target language, and a unit connected to the transforming unit for generating a translated sentence in the target language in accordance with the transformed syntactic in the target language.

Preferably, the translation machine further includes a unit for adding one or more parallel word and/or phrase specifying symbols to parallel words and/or phrases contained in the input sentence, a unit connected to the adding unit for detecting the parallel word and/or phrase specifying symbols added to the input sentence, a unit connected to the adding unit for storing a first part-of-speech information about the parallel words and/or phrases and for storing a second part-of-speech information about each word and/or phrase composing the parallel words and/or phrases, a unit connected to the storing unit for obtaining the first part-of-speech information about start locations of the parallel words and/or phrases specified by the symbols, parts of speech of the specified words and/or phrases and a number of morphological, for obtaining the second part-of-speech information about a start location of each one of the specified parallel words and/or phrases, a part of speech of each one of the specified words and/or phrases and a number of morphological of the specified words and/or phrases at a time when the detecting unit detects the symbols contained in the input sentence, and for storing the first and second part-of speech information in the part-of-speech information storing unit.

More preferably, the syntactic analyzing unit is capable of recognizing each one of the parallel words and/or phrases as parallel disposition based on both of the first and second part-of-speech information, and capable of analyzing a syntactic of the input sentence at a time when the part-of-speech storing unit stores the first and second part-of-speech information.

Further preferably, the specifying symbols include a parallel-disposition start symbol, a parallel element start symbol, a parallel element end symbol, and a parallel-disposition end symbol.

The parallel-disposition start symbol is nS_[ for noun, vS_[ for verb, aS_[for adjective, and dS_[ for adverb, preferably.

The parallel element start symbol is preferably [.

The parallel element end symbol is ], preferably.

The parallel-disposition end symbol is preferably E_[.

The translation machine further includes a main central processing unit for controlling an input of said sentence in said source language to said dictionary look up and morphological analyzing means, preferably.

The part-of-speech information storing unit is preferably composed of five buffers.

The source language is English and said target language is Japanese, preferably.

In operation, when the input sentence has ambiguous parallel disposition of some phrases or words, the unit for adding a parallel word and/or phrase specifying symbol serves to add the specifying symbol to the input sentence for specifying the parallel words and/or phrases.

When the unit for detecting the word or phrase specifying symbol serves to detect the specifying symbols added in the input sentence, the unit for storing part-of-speech information serves to obtain the first part-of-speech information about a start location of the parallel word and/or phrases specified by the symbol, a part of speech of the words and/or phrases, and the number of morphological of the specified words and/or phrases and the second part-of-speech information about a start location of each parallel word and/or phrase, a part of speech of each word and/or phrase, and the number of morphological of the specified words and/or phrases, based on the specifying symbols. Then, the first and the second part-of-speech information are stored in the part-of-speech information storing unit.

The syntactic analyzing unit serves to analyze the syntactic of the input sentence based on the part-of-speech information of each morphological composing the input sentence, the part-of-speech information being obtained by the dictionary look up and morphological analyzing unit. In the syntactic analysis, at a time when the part-of-speech information storing unit stores the first part-of-speech information and the second part-of-speech information, the words and/or phrases specified on both of the information are considered as parallel disposition, resulting in analyzing the syntactic of the input sentence on the consideration.

The syntactic analyzing unit performs the syntactic analysis on the consumption that the words and/or phrases specified by the specifying symbols are ranged in parallel. At a time when the input sentence has ambiguous parallel disposition of the words and/or phrases, the present translation machine is capable of rapidly generating an accurate translated sentence by adding the parallel word and/or phrase specifying symbol.

Further objects and advantages of the present invention will be apparent from the following description of the preferred embodiment of the invention as illustrated in the accompanying drawings.

BRIEF DESCRIPTION OF THE DRAWINGS

FIG. 11 is a view showing the content of a buffer provided in translating a sentence;

DESCRIPTION OF THE PREFERRED EMBODIMENTS

Referring to the accompanying drawings, an embodiment of the translation machine according to the present invention will be described in details.

Figure 1:
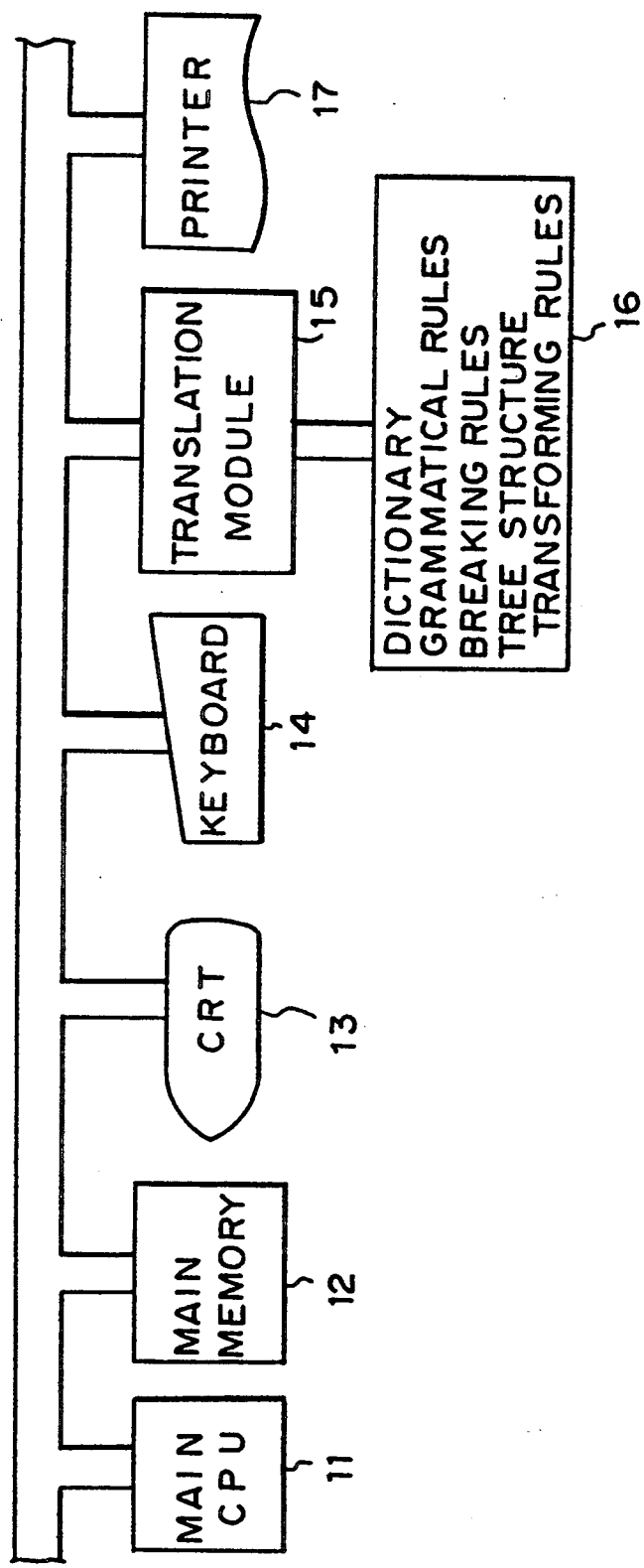
FIG. 1 is a block diagram showing a translation machine according to an embodiment of the present invention.

FIG. 1 is a block diagram showing a translation machine according to an embodiment of the present invention.

As shown in FIG. 1, the translation machine includes a central processing unit (CPU) 11, a main memory 12, a cathode-ray tube (CRT) 13, a keyboard 14, a translation module 15, a memory 16 for storing a translation dictionary and tree-structure transforming rules such as grammatical rule and breaking rules, a printer 17 for printing the resulting translation on paper.

The memory 16 is composed of the breaking rules storing unit.

The translation module 15 serves to translate a sentence in a source language entered from the keyboard 14 into the sentence in a target language, that is, the translated sentence. That is to say, the source-language sentence entered from the keyboard 14 is sent to the translation module 15 under the control of the main CPU 11. The translation module 15 serves to translate the source-language sentence into the target-language sentence by using the dictionary, the grammatical rules, the breaking rules and the tree-structure transforming rules stored in the memory 16. The translated result is printed on paper by the printer 17.

The main CPU 11 controls the CRT 13, the keyboard 14, the translation module 15 and the printer 17 for proceeding the translation process. The main memory 12 stores a translation program used in the main CPU 11. On the CRT 13, the input sentence in the source language, the translated sentence in the target language, and several kinds of indications are displayed. A user could provide any specification using the keyboard 14.

Figure 2:
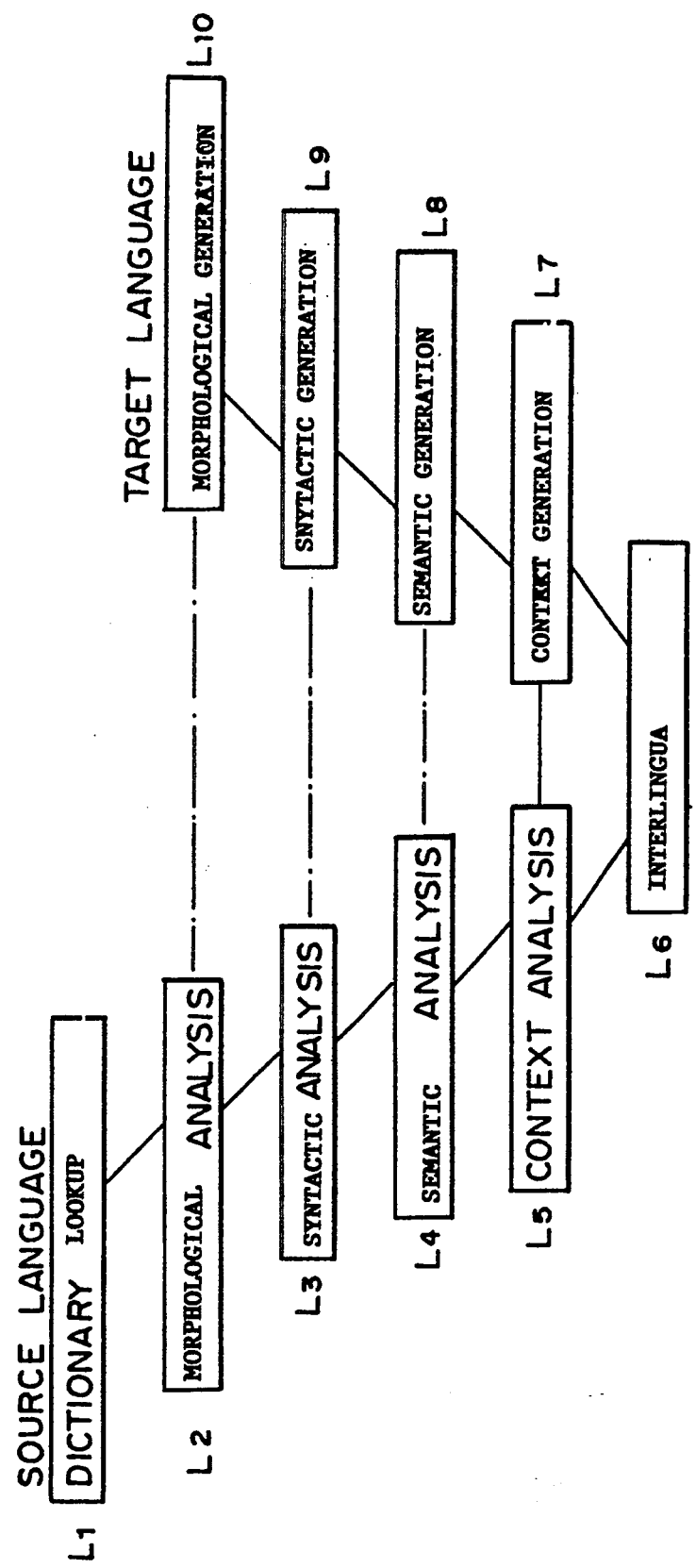
FIG. 2 is an explanatory view showing translation levels executed in the automatic translation.

The automatic translation executed in the translation module 15 has some analyzing levels as shown in FIG. 2.

When the sentence in the source language is input to the left upper block, the dictionary is consulted at the level L1, the morphological is analyzed at the level L2, and the syntactic is analyzed at the level L3, and the processes at the levels L4 and L5 are executed in sequence.

The automatic translation is, in large, divided into two parts depending on the analyzing methods.

In one part, the analysis of the input sentence proceeds from the level L1 to the level L6. The level L6 is independent of the source language and the target language. It concerns with a middle language. The creation of the target-language sentence proceeds from the level L6 to the creation of the context at the level L7, the creation of the meaning at the level L8, the creation of the syntactic at the level L9, and then to the creation of the morphological at the level L10.

The above-mentioned processes are referred to as a pivot system.

In the other part, the syntactic analysis of the input sentence proceeds up to one of the analysis of the morphological at the level L2, the analysis of the syntactic at the level L3, the analysis of the meaning at the level L4 and the analysis of the content at the level L5 for forming the internal structure of the source language. Then, the resulting internal structure of the source language is transformed into the internal structure of the target language at the same level. Next, based on the transformed internal structure, the translated sentence is created.

The above-mention processes are referred to as a transfer system.

Herein, each analyzing system will be described.

(A) Dictionary Consulting and Morpheme Analysis

The input sentence of the source language is divided into the morphological train (word train). By looking-up the dictionary stored in the memory 16 shown in FIG. 1, it is possible to obtain the grammatical information about a part of speech for each word and the translated counterpart and further analyze the tense, the personal and the number of each word.

(B) Syntax Analysis

The syntactic of the sentence (syntactic analyzing tree) indicating how the words being modified is defined as indicated later.

(C) Meaning Analysis

Of the syntactic-analyzed results obtained by the syntactic analysis of the word, the correct one is selected in light of meaning.

(D) Context Analysis

Based on the understanding of a topic contained in the input sentence, ambiguity is left out from the sentence.

The translation module 15 used in the present embodiment is designed to proceed up to the syntactic analysis at the level L3. It means that the translation module 15 is arranged to have the dictionary look up and morphological analyzing unit 151, the syntactic analyzing unit 152, the transforming unit 153 and the translated sentence generating unit 154.

Figure 3:
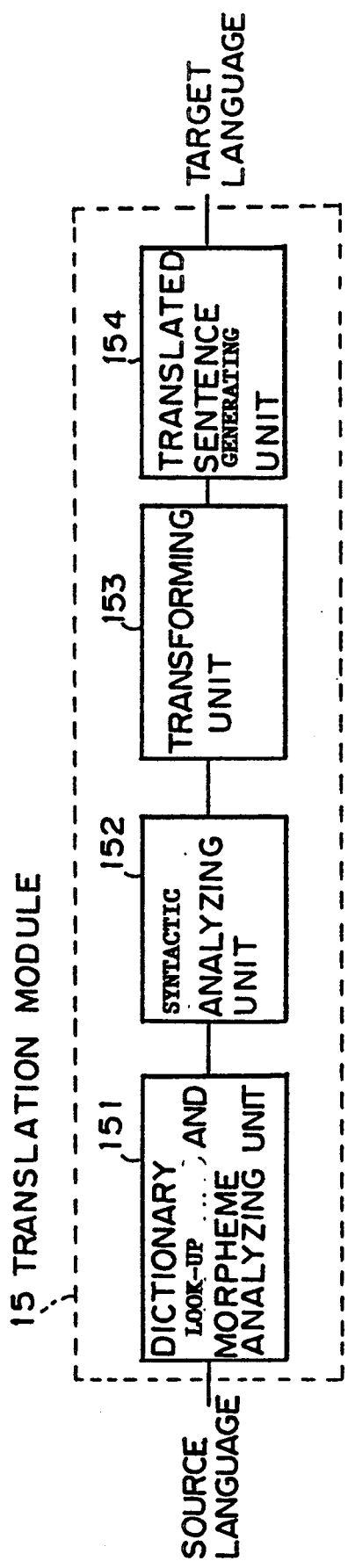
FIG. 3 is a block diagram showing a functional portion of a translation module included in the translation machine shown in FIG. 1.

FIG. 3 is a block diagram showing a concrete arrangement of the translation module 15.

Figure 4:
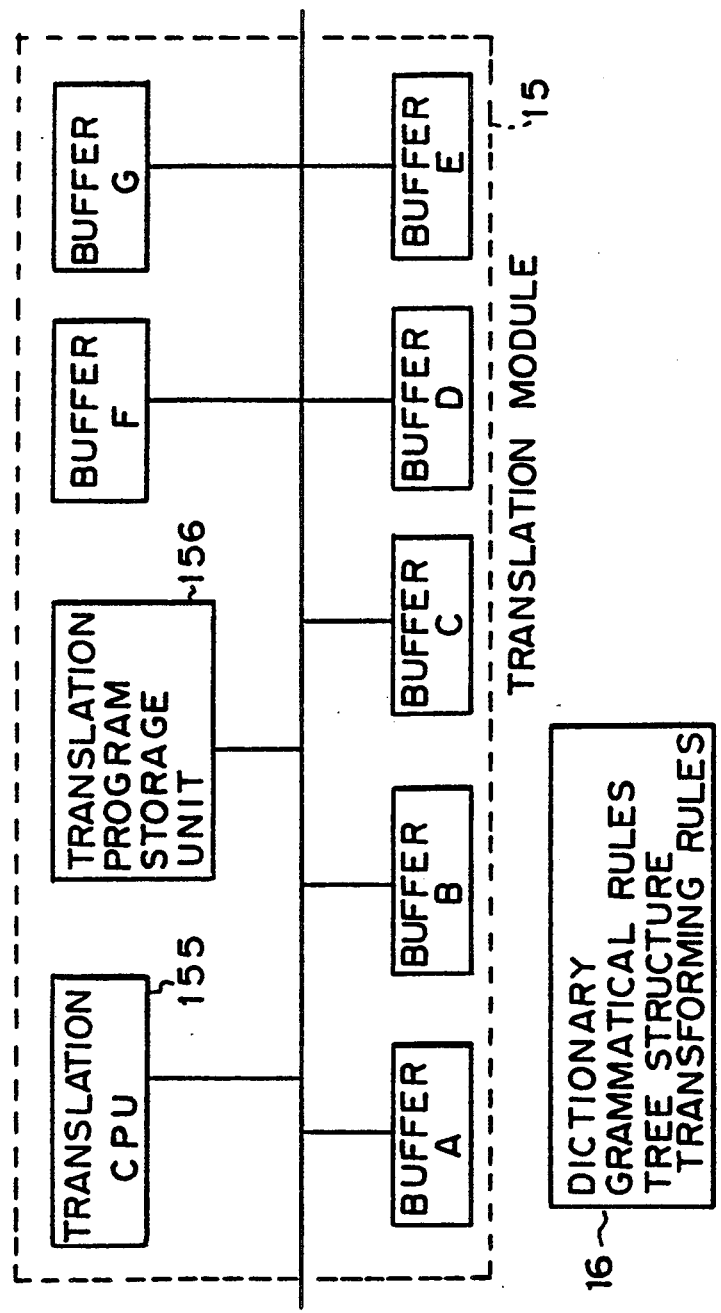
FIG. 4 is a block diagram showing the translation module shown in FIG. 3.

FIGS. 5 to 8 and Table 1 show the contents of the buffers A to E shown in FIG. 4 on an assumption that the input sentence in the source language (herein, English):

"This is a pen."

is translated into the counterpart of the target language (herein, Japanese).

The buffers F and G, which will be described in more details later, are used in this embodiment.

At first, the normal translating process from English to Japanese will be described with reference to FIGS. 3 to 8 and Table 1.

Figures 5, 6:
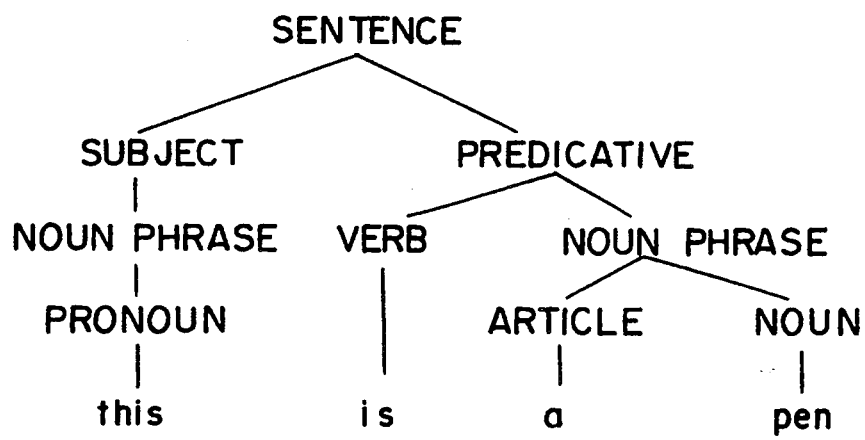
FIG. 5 is a view showing the content of a buffer included in the translation module.
FIG. 6 is a view showing the content of another buffer included in the translation module.

The original English sentence read in the translation module 15 is divided into the morphological as shown in FIG. 5 under the control of the translation CPU 155. The translation CPU 155 is controlled on a translation program stored in a translation program storage unit 158. The number is added to each divided morphological in sequence and the numbered morphological are stored in the buffer A of FIG. 4. The morphological train stored in the buffer A is read from the head in sequence. By looking-up the dictionary stored in the memory 16, it is possible to obtain the necessary information such as a translated counterpart and a part of speech for each morphological while it is read. The information about each morphological obtained as above is stored in the buffer B as being related with the core word of the morphological (i.e., the dictionary look up and morphological analysis are executed in the dictionary look up and morphological analyzing unit 151 shown in FIG. 3).

As a result, the information about a part of speech, which is part of the information, is stored as shown in Table 1.

TABLE 1

| Buffer B - Part of Buffer for Dictionary-Consulted Result | | |
|---|---|---|
| WORD LOCATION | CORE WORD | NOUN |
| 0 | This | Pronoun |
|  |  | Indicative Adjective |
| 1 | is | Verb |
| 2 | a | Article |
| 3 | pen | Noun |
| 4 | . | Period |

Herein, the word "this" contains a plurality of parts of speech but may be uniquely defined by the following syntactic analysis. That is to say, following the dictionary and the grammatical rules stored in the memory 16, the structure analyzing tree indicating how the words being modified is defined as shown in FIG. 6 and then is stored in the buffer C (i.e., the syntactic analysis is executed in the syntactic analyzing unit 152 shown in FIG. 3). This syntactic analyzing tree is defined as follows.

Of the grammatical rules stored in the memory 16, the grammatical rules for modifying the parts of speech stored in the buffer are selectively read from the memory 16. For the foregoing sentence, the following grammatical rules are read.

Grammatical Rule (a) Sentence=Nominative+Predicate

Grammatical Rule (b) Nominative=Noun Phrase

Grammatical Rule (c) Predicate=Verb+Noun Phrase

Grammatical Rule (d) Noun Phrase=Pronoun

Grammatical Rule (e) Noun Phrase=Article+Noun

These grammatical rules stand for the following meanings.

The grammatical rule (a) represents that the sentence consists of a nominative and a predicate.

The grammatical rule (b) represents that the nominative consists of a noun phrase.

The grammatical rule (c) represents that the predicate consists of a verb and a noun phrase.

The grammatical rule (d) represents that the noun phrase consists of a pronoun.

The grammatical rule (e) represents that the noun phrase consists of an article and a noun.

Herein, the structure analyzing tree is defined according to the above-mentioned grammatical rules.

Figures 7, 8:
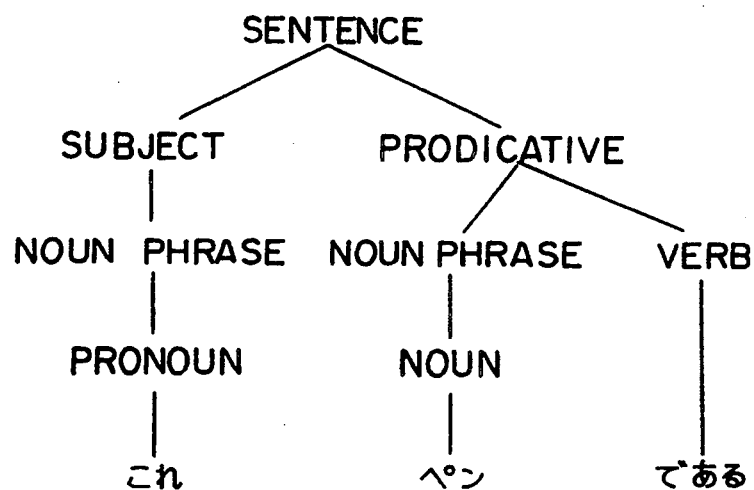
FIG. 7 is a view showing the content of another buffer included in the translation module.
FIG. 8 is a view showing the content of another buffer included in the translation module.

Next, using the transforming rules for the tree structure stored in the memory 16, the syntactic analyzing tree (see FIG. 6) of the input English sentence is transformed into the syntactic analyzing tree of Japanese as shown in FIG. 7. The resulting syntactic analyzing tree of Japanese is stored in the buffer D shown in FIG. 4 (i.e., the syntactic transformation is executed in the transforming unit 153 shown in FIG. 3).

Finally, the Japanese counterpart これはペンである. is obtained on the basis of the Japanese syntactic analyzing tree.

The proper Japanese particle "は" is added to the counterpart and is stored in the buffer E shown in FIG. 4 (i.e., the creation of the translated sentence is executed in the translated sentence generating unit 154 shown in FIG. 3.). The resulting Japanese sentence これはペンである. is output from the translation module 15 and is displayed on the CRT 13.

Herein, the detailed description will be described to the process for parallel words and/or phrases, which is a feature of this embodiment.

In this embodiment, by adding the parallel word and/or phrase specifying symbol for specifying the parallel disposition of the words and/or phrases contained in the input sentence of the source language, it is possible to obtain the accurate translated sentence in the target language without ambiguous parallel disposition of the words and/or phrases in the input sentence.

Table 2 (A) and (B) show the examples of the parallel word or phrase specifying symbols used for specifying parallel disposition of words or phrases. The symbols shown in Table 2 (A) are those for starting specification of parallel words or phrases (referred to as a parallel-disposition start symbol). These parallel-disposition start symbols have four types as shown in Table 2 (A), which respectively have the following meanings.

Table 2 (A)

| SYMBOL NUMBER | PARALLEL-DISPOSITION START SYMBOL | PART OF SPEECH |
|---|---|---|
| 1 | nS_[ | Noun |
| 2 | vS_[ | Verb |
| 3 | aS_[ | Adjective |
| 4 | dS_[ | Adverb |

Table 2 (B)

PARALLEL ELEMENT END SYMBOL: [

Table 2 (C)

PARALLEL ELEMENT END SYMBOL: ]

Table 2 (D)

PARALLEL-DISPOSITION END SYMBOL: E_[

The parallel-disposition start symbol "nS_[" of the symbol number "1" means that the whole parallel words or phrases delimited by this parallel-disposition start symbol are treated as nouns. The parallel-disposition start symbol "vS_[" of the symbol number "2" means that the whole parallel words or phrases delimited by this parallel-disposition start symbol are treated as verbs. The parallel-disposition start symbol "aS_[" of the symbol number "3" means that the whole parallel words or phrases delimited by this parallel-disposition start symbol are treated as adjectives. The parallel-disposition start symbol "dS_[" of the symbol number "4" means that the whole parallel words or phrases delimited by this parallel-disposition start symbol are treated as adverbs.

The symbol shown in Table 2 (B) is a symbol for specifying the start of parallel elements (referred to as a parallel element start symbol), which stand for the start of the specification of each word or phrase (referred to as a parallel element) of the parallel words or phrases. The symbol shown in Table 2 (C) is a symbol (referred to as a parallel element end symbol) for specifying the end of the parallel elements, which symbol stands for the end of the parallel elements. The symbol shown in Table 2 (D) is a symbol (referred to as a parallel-disposition end symbol) for specifying the end of the parallel words or phrases, which symbol stands for specification of the last parallel element of all the parallel words or phrases. As such, the words or phrases ranging from the parallel-disposition start symbol to the parallel-disposition end symbol are specified as parallel words or phrases. The parallel-disposition start symbol also serves as both the parallel element start symbol about the first parallel element, and the parallel element end symbol about the last parallel element also serves as the last one of all the parallel words or phrases.

The foregoing parallel word or phrase specifying symbols are allowed to be added to the input sentence in accordance with the indication given from the keyboard 14, that is, the keyboard 14 corresponds to the unit for adding the parallel word or phrase specifying symbols.

The translation machine arranged as described above is capable of translating the input sentence in the source language having the parallel-disposition start symbol, the parallel element start symbol, the parallel element end symbol and the parallel-disposition end symbol added thereto into the sentence in the target language as described below.

Figure 9:
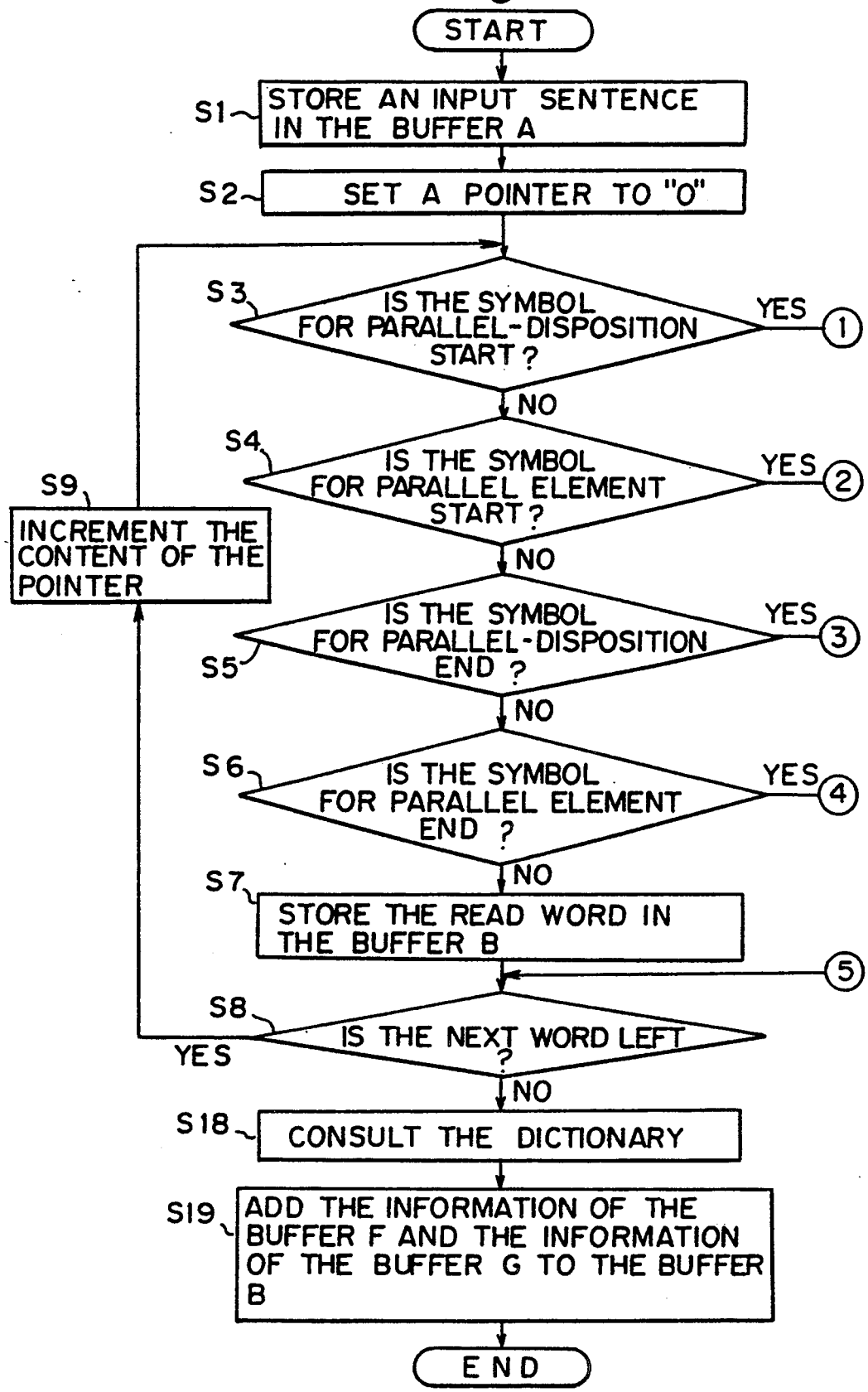
FIG. 9 is a flowchart showing an example of a parallel word or phrase processing operation.
Figure 10:
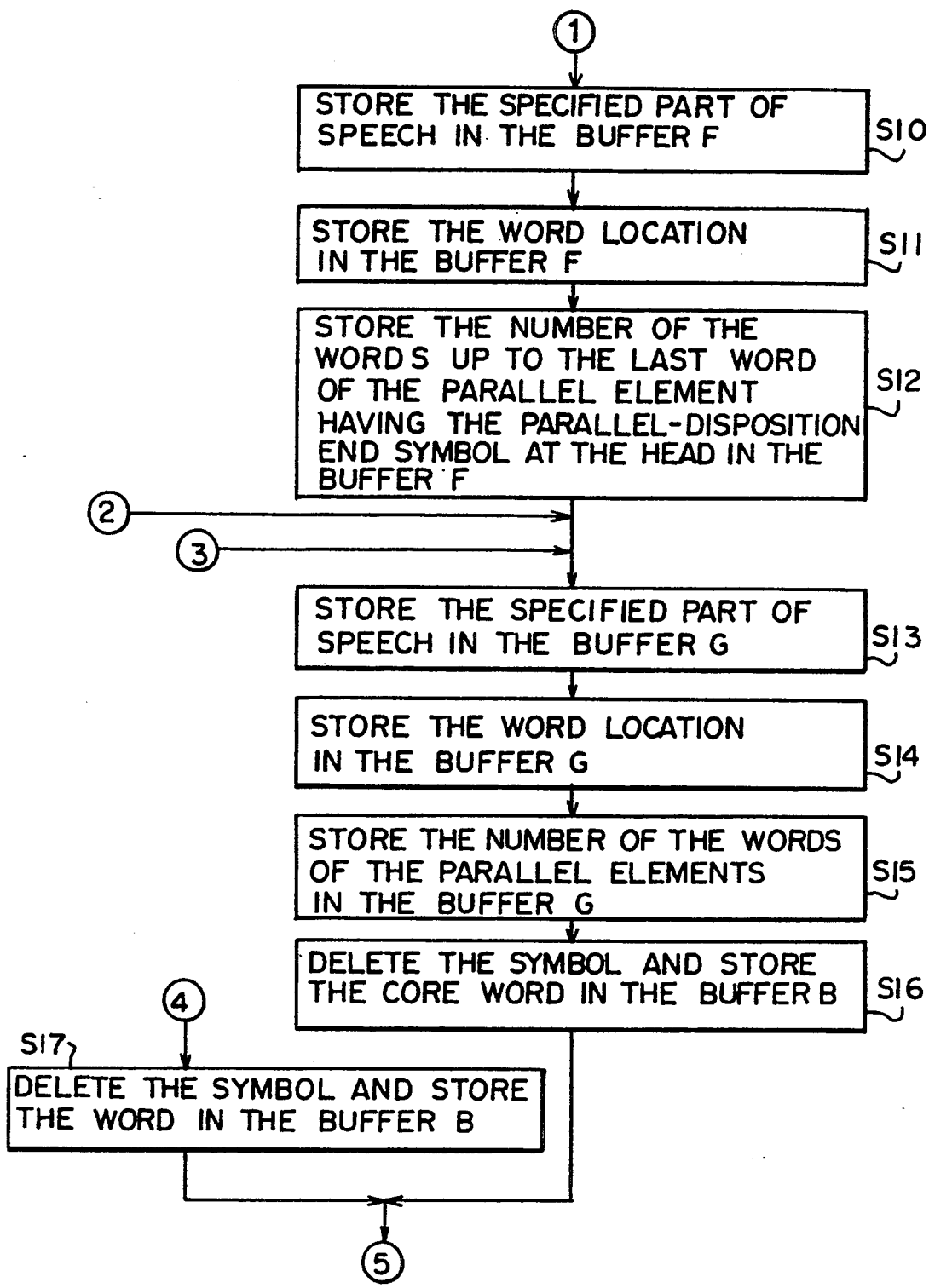
FIG. 10 is a flowchart showing the parallel word or phrase processing operation after the flowchart shown in FIG. 9.

FIGS. 9 and 10 are flowcharts for illustrating the parallel word or phrase processing operation executed by the translation CPU 155 (corresponding to the dictionary look up and morphological analyzing unit 151) of the translation module 15 shown in FIGS. 1, 3 and 4.

The parallel word ar phrase processing operation will be described in detail with reference to FIGS. 9 and 10.

The input sentence in the source language is divided into the morphological (simply referred to as words for more brief description) and the number is add to the words from the head in sequence (step S1). The words with the numbers added thereto are stored in the buffer A shown in FIG. 4.

A "0" is set to a pointer so that the word with the number "0" added thereto is read from the buffer A (step S2).

It is determined whether or not the head of the read word matches to the parallel-disposition start symbol (step S3). If it is, the process goes to a step S10 and if not, the process proceeds to a step S4.

It is determined whether or not the head of the read word matches to the parallel element start symbol (step S4). If it is, the process goes to a step S13 and if not, the process proceeds to a step S5.

It is determined whether or not the head of the read word matches to the parallel-disposition end symbol (step S5). If it is, the process goes to the step S13 and if not, the process proceeds to a step S6.

It is determined whether or not the tail of the read word matches to the parallel element end symbol (step S6). If it is, the process goes to a step S17 and if not, the process proceeds to a step S7.

The core word of the read word is stored in the buffer B shown in FIG. 4 at the word location adjacent to the location where the core word has been already stored (step S7).

It is determined whether or not the next word is stored in the buffer A (step S8). If it is, the process goes to a step S9 and if not, the process proceeds to a step S18.

The content of the pointer is incremented (step S9). Then, the word with the next number added thereto is read from the buffer A. The process returns to the step S3 at which the process starts for the next word.

Since all the parallel words or phrases having the parallel-disposition start symbol at their heads are treated as one unit, the content of the parallel-disposition start symbol specifies the title of the part of speech of all the parallel words of phrases regarded as one unit (step S10). The specified part of speech is stored in the buffer F shown in FIG. 4.

The location of the word (that is, the number set to the pointer) is stored in the buffer F as being related to the stored part of speech (step S11).

The words from the subject word to the last word (parallel word) having the parallel-disposition end symbol at its head are counted in number (step S12). The counted number of the words is stored in the buffer F as being related to the part of speech and the word location pre-stored in the buffer F.

That is, the first part-of-speech information about the parallel words or phrases is composed of the part of speech, the word location and the number of word stored in the buffer F.

The title of the part of speech specified by the content of the parallel-disposition start symbol is stored in the buffer G shown in FIG. 4 (step S13).

The location of the subject word is stored in the buffer G as being related to the title of the part of speech pre-stored in the buffer G (step S14).

The words composing the parallel elements having the parallel-disposition start symbol, the parallel element start symbol or the parallel-disposition end symbol at the head are counted in number (step S15). The counted number of the words is stored in the buffer G as being related to the title of the part of speech and the word location pre-stored in the buffer G.

That is, the second part-of-speech information about the parallel elements is composed of the part of speech, the word location and the number of words stored in the buffer G.

The parallel-disposition start symbol, the parallel element start symbol or the parallel-disposition end symbol is deleted (step S16). Only the core word is stored at the location adjacent to the word location where the core word has been already stored in the buffer B. Then, the process goes to the step S8.

The parallel element end symbol is deleted (step S17). Only the core word is stored at the location next to the word location where the core word has been already stored in the buffer B. Then, the process goes to the step S8.

Since it is determined that the next word is not left at the step S8 (that is, the core word of all the words composing the input sentence is stored in the buffer B), the dictionary stored in the memory 16 is consulted so as to obtain a part of speech of each core word stored in the buffer B (step S18). The obtained part of speech of each core word and the number of words compose the part-of-speech information, which is stored in the buffer B as being related to each core word.

The content of the buffer F obtained at the steps S10 to S12 and the content of the buffer G obtained at the steps to S15 are added to the part-of-speech information about the core word at the corresponding word location in the buffer B (step S19). Then, the parallel word or phrase processing operation is terminated.

According to this embodiment, as mentioned above, the translation CPU 155 is composed of the unit for detecting the parallel word or phrase specifying symbol and the unit for storing the part-of-speech information. The part-of-speech information storing unit is composed of the buffers B, F and G.

Based on the part-of-speech information stored in the buffer B, the syntactic analyzing unit 152 serves to execute the syntactic analysis of the input sentence.

As set forth above, since the input sentence has the parallel-disposition start symbol, the parallel-disposition end symbol, the parallel element start symbol and the parallel element end symbol added thereto, a plurality of words or phrases laid at the interval between the parallel-disposition start symbol and the last parallel element end symbol (that is, the parallel element end symbol corresponding to the parallel-disposition end symbol) are regarded as parallel disposition.

For each word or phrase (that is, parallel element), the second part-of-speech information is set to have the word location, the part of speech and the number of words. Then, the second part-of-speech information is added to the part-of-speech information about the word stored in the buffer B. Further, all the words laid within the interval are regarded as one idiom.

Next, the first part-of-speech information is set to include the location of the head word of the idiom, the part of speech of the idiom and the number of the words. The first part-of-speech information is added to the information about each word stored in the buffer B.

In analyzing the syntactic, the syntactic analysis is correctly executed if the words or phrases located at the interval are disposed in parallel. Further, the word train located at the interval is syntactic-analyzed as one idiom.

In turn, as taking an example sentence, the description will be directed to the foregoing operation for processing the parallel word or phrases with references to FIGS. 9 and 10. Herein, the source language is English and the target language is Japanese.

From the keyboard 14, an operator inputs the following sentence (A) of

"He played cards in nS_[the room], [the yard], and E_[the garage] of his house."

Here, the parallel-disposition start symbol, the parallel element start symbol, the parallel element end symbol and the parallel-disposition end symbol are provided.

After dividing the input sentence (A) into the words, the number is added to each word in sequence from the head as shown in FIG. 11 and the words with the numbers added thereto are stored in the buffer A.

The pointer for specifying the word location is set to "0" so as to read the head word "He" from the buffer A. The read word "He" is stored at the word location "0" of the buffer B as shown in Table 5, because the head "H" does not match to any one of the parallel-disposition start symbol, the parallel element start symbol and the parallel-disposition end symbol, and the tail "e" does not match to the parallel element end symbol. Since the unprocessed words are left such as "played", the content of the pointer is incremented so as to continue the process of the left words such as "played". From "played" to "in" whose number of the buffer A is "3", none of the parallel-disposition start symbol, the parallel-disposition end symbol, the parallel element start symbol and the parallel element end symbol are located at their heads or tails. Hence, as shown in Table 5, the core word corresponding to each word itself is stored at the locations "1" to "3" of the buffer B (refer to the above-described Steps S1 to S9).

Next, the pointer is set to "4" and the word "nS_[the" is read from the buffer A. Since the head "nS_[" of the read word "nS_[the" is a parallel-disposition start symbol, as shown in Table 3, the part of speech "noun" indicated by the content of the parallel-disposition start symbol "nS_[", the word location "4", and the number of the words from the word "nS_[the" to the last word "garage]" of the parallel element "E_'the garage]" having the parallel-disposition end symbol at their heads are stored in the buffer F.

As shown in Table 4, the part of speech "noun" specified by the content of the parallel-disposition start symbol 37 nS_[", the word location "4", and the number "2" of the words composing the parallel elements "nS_[the room]" having the parallel-disposition start symbol "nS_[" at the head are stored in the buffer G. Then, the parallel-disposition start symbol "nS_[" is deleted from the word "nS_[the". It results in only the core word "the" being stored in the word location "4" of the buffer B as shown in Table 5 (refer to the above-described steps S9, S3, S10 to S16, S8).

TABLE 3

| | Buffer F | |
| WORD LOCATION | PART OF SPEECH | NUMBER OF WORDS |
| --- | --- | --- |
| 4 | Noun | 9 |

TABLE 4

| | Buffer G | |
| WORD LOCATION | PART OF SPEECH | NUMBER OF WORDS |
| --- | --- | --- |
| 4 | Noun | 2 |
| 7 | Noun | 2 |
| 11 | Noun | 2 |

TABLE 5

| | Buffer B |
| WORD LOCATION | CORE WORD |
| --- | --- |
| 0 | He |
| 1 | played |
| 2 | cards |
| 3 | in |
| 4 | the |
| 5 | room |
| 6 | , |
| 7 | the |
| 8 | yard |
| 9 | , |
| 10 | and |
| 11 | the |
| 12 | garage |
| 13 | of |
| 14 | his |
| 15 | house |
| 16 | . |

Next, the content of the pointer is incremented and the word "room]" is read from the buffer A. Since the read word "room]" has the parallel element end symbol "]" at the tail, the parallel element end symbol "]" is deleted from the word "room]". Then, as shown in Table 5, only the core word "room" is stored at the word location "5" of the buffer B (refer to the above-described steps S9, S3 to S6, S17, S8).

Next, the content of the pointer is incremented and the word "," is read from the buffer A. Since the word "," has none of the parallel-disposition start symbol, the parallel-disposition end symbol, the parallel element start symbol and the parallel element end symbol, the core word "," is stored at the word location "6" of the buffer B (refer to the above-described steps S9 and S3 to S8).

The content of the pointer is incremented and the word "[the" is read from the buffer A. Since the read word "[the" has the parallel element start symbol "[" at the head, as shown in Table 4, the part of speech "noun" specified by the content of the parallel-disposition start symbol "nS_[", the word location "7", and the number "2" of the words composing the parallel elements "[the yard]" having the parallel element start symbol "[" at the head are stored in the buffer G.

Then, the parallel element start symbol "[" is deleted from the word "[the". Hence, as shown in Table 5, only the core word is stored at the word location "7" of the buffer B (refer to the above-described steps S9, S3, S4, S13 to S16, and S8).

Like the above process, the processes for the words "yard]", ",", and "and" are carried out (refer to the above-described steps S9, S3 to S8, S17).

In the meantime, the pointer is set to "11" and then the word "E_[the" is read from the buffer A. Since the read word "E_[the" has the parallel-disposition end symbol "E_[" at the head, as shown in Table 4, the part of speech "noun" specified by the content of the parallel-disposition start symbol "nS_[", the word location "11", and the number "2" of the words composing the parallel elements "E_[the garage]" having the parallel-disposition end symbol "E_[" at the head are stored in the buffer G. Then, the parallel-disposition end symbol "E_[" is deleted from the word "E_[the". Hence, as shown in Table 5, only the core word "the" is stored at the word location "11" of the buffer B (refer to the above-described steps S9, S3 to S5, S13 to S16, S8).

Like the foregoing process, the processes for the words "garage]", "of", "his", "house" and "." are carried out (refer to the above-described steps S9, S3 to S8, S17).

Upon the termination of the process for the tail word ".", the parallel word or phrase processing operation is terminated for the example sentence (A). As a result, the information shown in Table 5 is stored in the buffers B, F and G as shown in Tables 3, 4 and 5.

Then, as shown in Table 5, the dictionary is consulted on the core word of the word stored in the buffer B so as to obtain the part-of-speech information containing a part of speech for each core word and the number of the words. Then, as shown in Table 6, the part-of-speech information is stored at the column of "part of speech 1, the number of word 1" of the buffer B.

TABLE 6

| | Buffer B | | |
|---|---|---|---|
| WORD LOCATION | CORE WORD | PART OF SPEECH | NUMBER OF WORDS |
| 0 | He | Pronoun | 1 |
| 1 | played | Verb | 1 |
| 2 | cards | Noun | 1 |
| 3 | in | Preposition | 1 |
| 4 | the | Article | 1 |
| 5 | room | Noun | 1 |
| 6 | , | Comma | 1 |
| 7 | the | Article | 1 |
| 8 | yard | Noun | 1 |
| 9 | , | Comma | 1 |
| 10 | and | Conjunction | 1 |
| 11 | the | Article | 1 |
| 12 | garage | Noun | 1 |
| 13 | of | Preposition | 1 |
| 14 | his | Definitive | 1 |
| 15 | house | Noun | 1 |
| 16 | . | Period | 1 |

The column of "noun" of the buffer B shown in Table 1 corresponds to the column of "part of speech 1, the number of words 1" shown in Table 6. Next, the second part-of-speech information stored in the buffer G is stored in the column of "part of speech 2, the number of words 2" at the corresponding word location of the buffer B. As shown in Table 7, the first part-of-speech information stored in the buffer F is stored at the column of "part of speech 3, the number of words 3" at the corresponding word location of the buffer B.

TABLE 7

| | | | | Buffer B | | | |
|---|---|---|---|---|---|---|---|
| WORD LOCATION | CORE WORD | PART OF SPEECH 1 | NUMBER OF WORDS 1 | PART OF SPEECH 2 | NUMBER OF WORDS 2 | PART OF SPEECH 3 | NUMBER OF WORDS 3 |
| 0 | He | Pronoun | 1 | | | | |
| 1 | played | Verb | 1 | | | | |
| 2 | cards | Noun | 1 | | | | |
| 3 | in | Prep. | 1 | | | | |
| 4 | the | Article | 1 | Noun | 2 | Noun | 9 |
| 5 | room | Noun | 1 | | | | |
| 6 | , | Comma | 1 | | | | |
| 7 | the | Article | 1 | Noun | 2 | | |
| 8 | yard | Noun | 1 | | | | |
| 9 | , | Comma | 1 | | | | |
| 10 | and | Conj. | 1 | | | | |
| 11 | the | Article | 1 | Noun | 2 | | |
| 12 | garage | Noun | 1 | | | | |
| 13 | of | Prep. | 1 | | | | |
| 14 | his | Def. | 1 | | | | |
| 15 | house | Noun | 1 | | | | |
| 16 | . | Period | 1 | | | | | where, Prep. = Preposition, Conj. = Conjunction, Def. = Definitive

Though the word "the" at the word location "4" of the buffer B has a part of speech "article" according to the dictionary-looking-up operation, the foregoing process makes it possible to add to the word "the", the part of speech "noun" of the word number "2" according to the second part-of-speech information stored in the buffer G, that is, the two words "the room" containing the word "the" is treated as one idiom.

Further, in analyzing the syntactic, these two words are allowed to be treated as one noun. This is true to the word "the" at the word location "7" and the word "the" at the word location "11". When the syntactic is analyzed in the syntactic analyzing unit 152 as shown in FIG. 3, these three idioms containing the words "the" are treated as parallel disposition.

The part of speech "noun" of the word number "9" is added to the word "the" at the word location "4" of the buffer B. The part of speech "noun" of the word number "9" is derived from the first part-of-speech information stored in the buffer F, that is, the six words composing the three idioms "the room", "the yard" and "the garage" containing the word "the", the two words "," located between two of these idioms, and one word "and", that is, the nine words are treated as one idiom.

In analyzing the syntactic, these nine words are allowed to be processed as one noun.

Hence, the dictionary look up and morphological analyzing unit 151 included in the translation module 15 terminates the dictionary look up and morphological analysis and the process for the parallel words or phrases. Based on the part-of-speech information of each word stored at the column "part of speech 1 word number 1" of the buffer B, the syntactic analyzing unit 152 serves to carry out the syntactic analysis of the example sentence (A).

Since the second part-of-speech information "noun 2" stored at the column of "part of speech 2, word number 2", the word "the" stored at the word locations "4", "7" and "11" of the buffer B is regarded to be the united words "the room". "the yard" and "the garage".

That is, the part-of-speech information stored at the column of "noun 1, the word number 1" is disregarded with respect to the word "the" Further, since the part-of-speech information of "noun 9" is stored at the column of "noun 3, word number 3", the word "the" stored at the word location "4" is regarded as the head of one noun idiom composed of the nine words "the room, the yard, and the garage". Hence, the nine words "the room, the yard, and the garage" of the sentence (A) are syntactic-analyzed as shown in the block (A) of FIG. 12. Later, the syntactic analysis proceeds with these nine words "the room, the yard, and the garage" being regarded as one noun idiom.

From the grammatical rules stored in the memory 16, the following grammatical rules for analyzing the parts of speech of the sequential words included in the sentence (A) are read:

Grammatical rule (d) noun phrase - pronoun
Grammatical rule (f) sentence - declarative sentence + period
Grammatical rule (g) declarative sentence - noun phrase + verb phrase
Grammatical rule (h) noun phrase - noun
Grammatical rule (i) noun phrase - definitive + noun
Grammatical rule (j) noun phrase - noun phrase + prepositional phrase
Grammatical rule (k) verb phrase - verb + noun phrase
Grammatical rule (1) verb phrase - verb phrase + prepositional phrase
Grammatical rule (m) prepositional phrase - preposition + noun phrase
Grammatical rule (n) noun - noun + comma + noun + comma + conjunction + noun (exclusive rule when the parallel disposition is specified)

Figure 12:
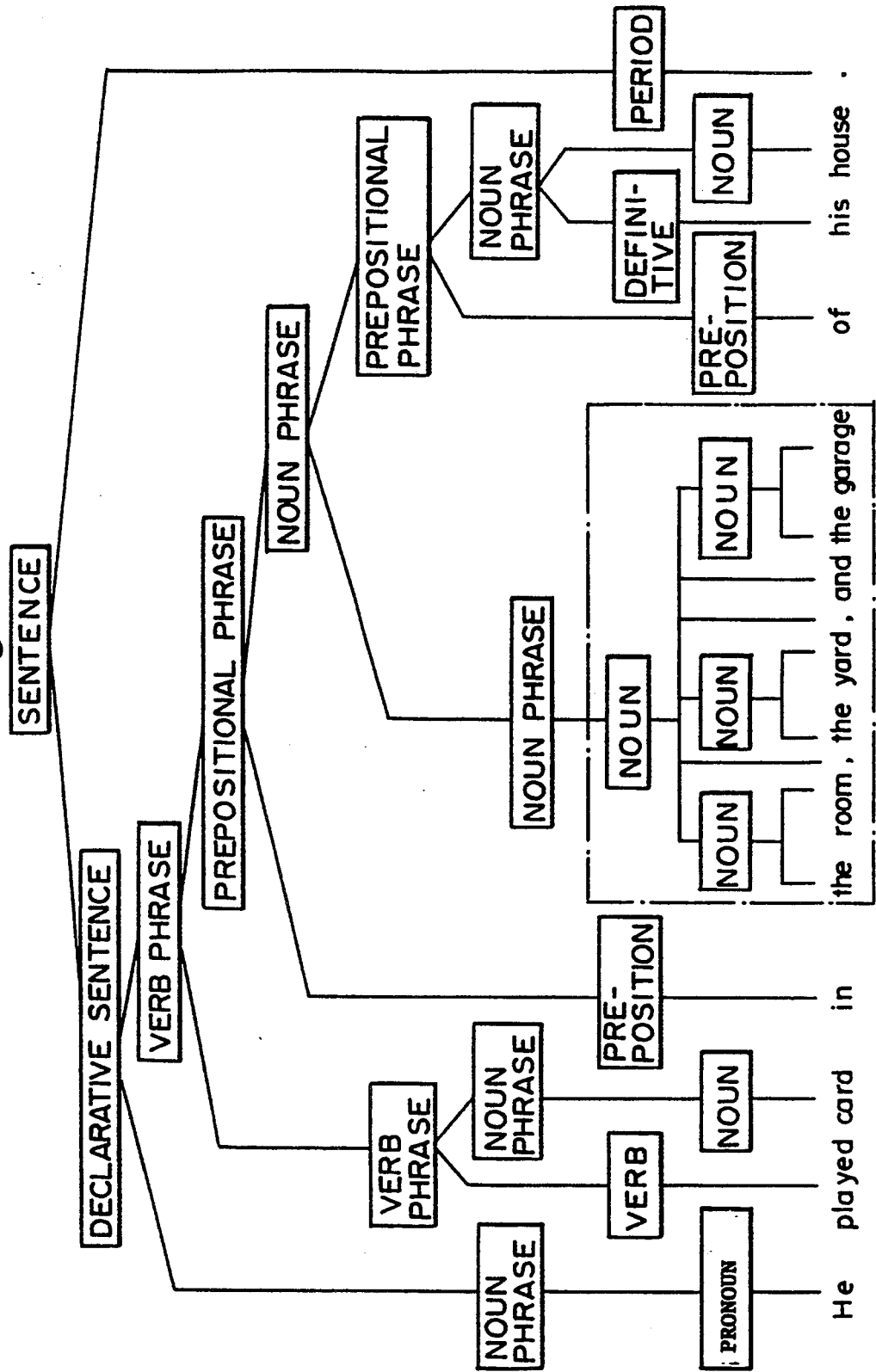
FIG. 12 is a view showing a syntactic analyzing tree obtained in case of adding the symbols for specifying parallel words or phrases in translating the sentence.

By using these grammatical rules, the syntactic analysis is executed on each part-of-speech information stored in the buffer B as shown in Table 7. It results in forming the syntactic analyzing tree as shown in FIG. 12. Herein, the grammatical rule (n) is one of the grammatical rules used when the parallel word or phrase specifying symbol is located in the input sentence.

In this syntactic-analyzed result, the portion specified by the parallel word or phrase specifying symbol is regarded as follows. That is, the portions "the room", "the yard" and "the garage" are regarded as nouns, respectively. Next, based on each piece of part-of-speech information about a word location, a noun and a word number stored in the buffer B, the most approximate grammatical rule (n) of the exclusive rules when the parallel disposition is specified is applied to those words, resulting in regarding the nine words "the room, the yard, and the garage" as one noun.

Based on the resulting syntactic-analyzing tree, the transforming unit 153 of the translation module 15 serves to transform the English sentence into the Japanese counterpart. Then, the translated sentence generating unit 154 serves to create the translated sentence based on the transformed result. It results in generating the Japanese translated sentence of:

"彼は、彼の家の部屋、中庭、及び車庫においてカードをプレイした。"

In a case that the parallel-disposition start symbol, the parallel-disposition end symbol, the parallel element start symbol, and the parallel element end symbol are not added to the sentence (A), the dictionary look up and morphological analyzing unit 151 performs the parallel processing and the dictionary-looking-up operation. As a result, the part-of-speech information is stored in the buffer B as shown in Table 6. Then, from the grammatical rules stored in the memory 16, the grammatical rules for forming the parts of speech of the sequential words included in the sentence (A) are read as a tree in a bottom-to-up manner. These rules are as follows:

Grammatical rule (d) Nouns phrase - pronoun
Grammatical rule (f) Sentence - declarative + period
Grammatical rule (g) Declarative sentence - noun phrase + verb phrase
Grammatical rule (h) Noun phrase - noun
Grammatical rule (i) Noun phrase - definitive + noun
Grammatical rule (j) Noun phrase - noun phrase + prepositional phrase
Grammatical rule (k) Verb phrase - verb + noun phrase
Grammatical rule (l) Verb phrase - verb phrase + prepositional phrase
Grammatical rule (m) Prepositional phrase - preposition + noun phrase
Grammatical rule (e) Noun phrase - article + noun
Grammatical rule (o) Noun phrase - noun phrase + conjunction (for parallel disposition)
Grammatical rule (p) Noun phrase - noun phrase + noun phrase
Grammatical rule (q) Noun phrase - noun phrase + comma (for parallel disposition)

Figure 13:
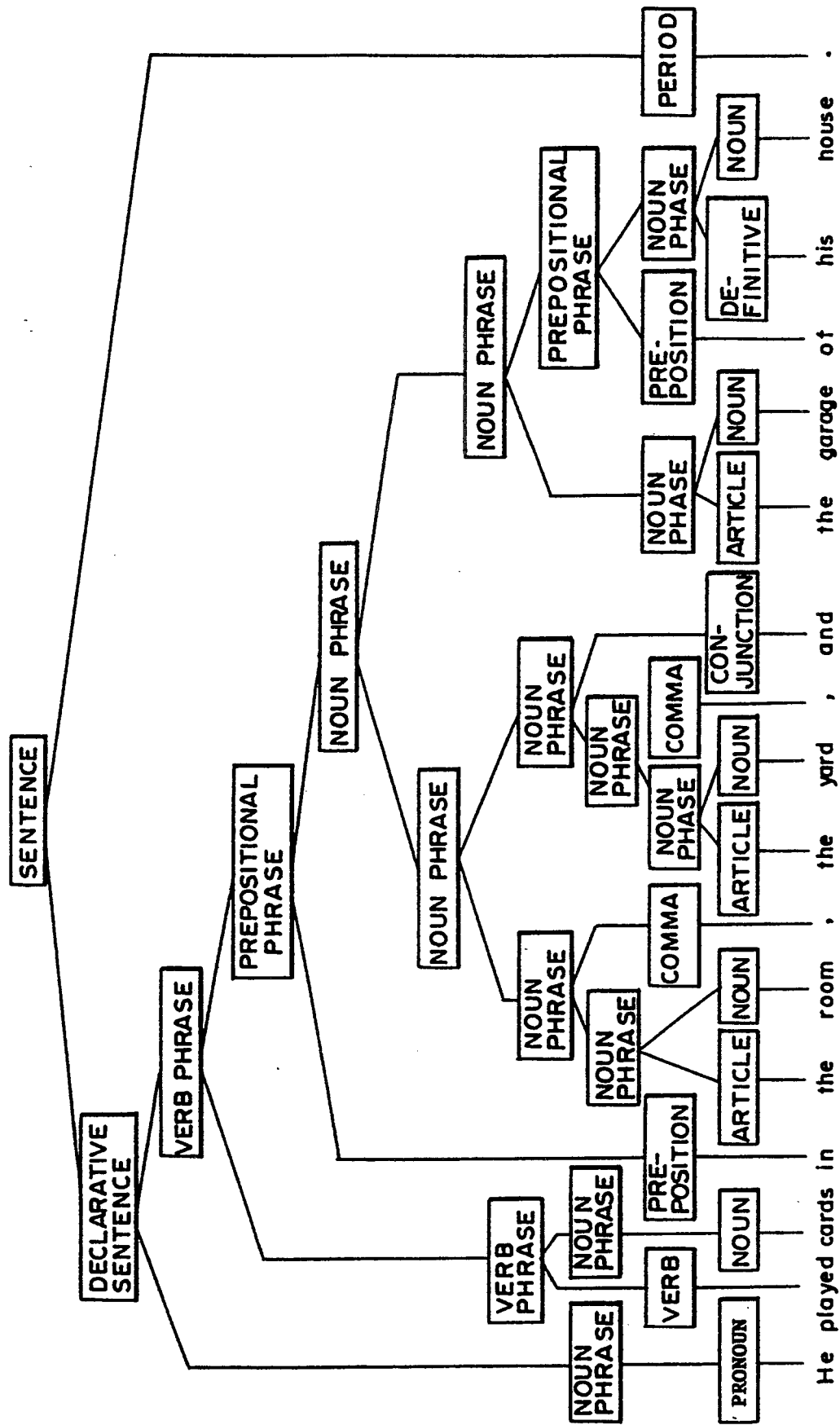
FIG. 13 is a view showing a syntactic analyzing tree obtained in case of adding no symbols for specifying parallel words or phrases in translating the sentence.

By using these grammatical rules, the syntactic analysis is carried out on the basis of each piece of part-of-speech information stored in the buffer B as shown in Table 6. It results in forming a syntactic analyzing tree as shown in FIG. 13.

According to the syntactic-analyzed result, it is regarded that the three phrases "the room", "the yard", and "the garage of his house" are disposed in parallel.

Then, the transforming process is carried out on the basis of the resulting syntactic analyzing tree and the translated sentence generating process is carried out on the basis of the transformed result are carried out, resulting in generating the Japanese translated sentence of:

"彼は、部屋、中庭、及び彼の家の車庫においてカードをプレイした。"

(meaning that "his house" modifies only "the garage".)

Hence, the created translated sentence is against the operator's intention.

As set forth above, in a case that the parallel disposition of the words or phrases may be erroneously recognized because of the ambiguous modifying structure of the input sentence, the operator uses the keyboard 14 to give an instruction for adding the parallel word or phrase specifying symbol to the input sentence. The parallel-disposition start signal is added immediately before the first parallel element of the parallel words or phrases. The parallel-disposition end symbol is added immediately before the last parallel element of the parallel words or phrases. The parallel element start symbol is added immediately before the parallel elements except the first and the last elements. The parallel element end symbol is added immediately after all the parallel elements composing the parallel words or phrases.

Then, the dictionary look up and morphological analyzing unit 151 of the translation module 15 serves to perform the proper process for parallel words or phrases, resulting in the first part-of-speech information being stored in the buffer F on the basis of those symbols. The first part-of-speech information is used for treating as one idiom the words ranging from the first word having the parallel-disposition start symbol at the head to the last word having the parallel-disposition end symbol at the head. This first part-of-speech information consists of the word location of the word having the parallel-disposition start symbol at the head, the number of the words treated as one idiom, and the part of speech of the idiom. The foregoing proper process for parallel words or phrases allows the second part-of-speech information in the buffer G to be stored in the buffer G on the basis of those symbols. The second part-of-speech information is used for treating as one idiom the words ranging from the word having the parallel-disposition start symbol, the parallel element start symbol or the parallel-disposition end symbol at the head to the word having the corresponding parallel element end symbol at the head. This second part-of-speech information consists of the word location of the word having the parallel-disposition start symbol, the parallel element start symbol or the parallel-disposition end symbol at the head, the number of the words treated as one idiom, and the part of speech of the idiom.

Then, the dictionary is consulted on the basis of each core word of the words composing the input sentence for the purpose of obtaining the part-of-speech information for each word of the input sentence. Then, the part-of-speech information is stored in the buffer B. The first part-of-speech information is read from the buffer F and added to the corresponding word location of the buffer G.

In the syntactic analysis done in the syntactic analyzing unit 152 of the translation module 15, the words ranging from the word having the parallel-disposition start symbol, the parallel element start symbol or the parallel-disposition end symbol at the head to the word having the corresponding parallel element end symbol at the tail are treated as one idiom on the basis of the part-of-speech information added to the buffer B. These idioms are treated as parallel disposition. The words ranging from the first word having the parallel-disposition start symbol at the head to the last word having the parallel-disposition end symbol at the head are treated as one idiom.

Hence, the parallel relation among some words of the input sentence becomes so clear that the words or phrases specified by the symbols are properly determined as parallel disposition.

In the foregoing embodiment, the part-of-speech information storing unit is composed of the buffer B, the buffer F and the buffer G. This invention is not limited to it. For example, the first part-of-speech information and the second part-of-speech information are allowed to be stored in the buffer B.

According to the present invention, the arrangements and the contents of the buffers A to G are not limited to those of the foregoing embodiment.

The formats of the parallel-disposition start symbol, the parallel-disposition end symbol, the parallel element start symbol and the parallel element end symbol are not limited to those formats shown in Table 2. What they need for the formats in this invention is the formats by which the start of the parallel words or phrases, the end of the parallel words or phrases, the start of the parallel elements, the end of the parallel elements and the noun of the parallel words or phrase are specified.

The algorithm for processing the parallel words or phrases according to this invention is not limited to the algorithm described in the foregoing embodiment.

In the embodiment, the source language is English, while the target language is Japanese. It goes without saying that these languages according to the invention are not limited to those described in this embodiment.

Many widely different embodiments of the present invention may be constructed from the spirit and the scope of the present invention. It should be understood that the present invention is not limited to the specific embodiments described in the specification, except as defined in the appended claims.

What is claimed is:

1. A translation machine for translating into a target language a sentence including a plurality of words and/or phrases, a word and/or phrase group of a plurality of other words and/or phrases, a parallel-disposition start symbol just before said word and/or phrase group, and a parallel-disposition end symbol, said start symbol including a part-of-speech specifying symbol, said machine comprising:

a first storing means for storing said sentence in a first buffer;

a second storing means for storing sequentially in a second buffer a first information unit including said words and/or phrases and said other words and/or phrases, and the corresponding word locations thereof;

a third storing means for storing in a third buffer a second information unit including said part-of-speech specifying symbol, a word location just after said start symbol, and the number of said other words and/or phrases between said start symbol and said end symbol; and an adding means for adding said second information stored in said third buffer to said first information stored in said second buffer.

2. A translation machine according to claim 1, wherein said part-of-speech specifying symbol specifies a part-of-speech of said word and/or phrase group as one of a noun, a verb, an adjective and an adverb, said start symbol indicates a start of said word and/or phrase group, and said end symbol indicates an end of said word and/or phrase group.

3. A translation machine according to claim 2, wherein said part-of-speech specifying symbol is nS for noun, vS for verb, aS for adjective, and dS for adverb.

4. A translation machine according to claim 3, wherein said start symbol is nS [ for noun, vS [ for verb, aS [ for adjective, and dS [ for adverb.

5. A translation machine according to claim 4, wherein said end symbol is E [.

6. A translation machine according to claim 1, wherein said sentence further includes a parallel element start symbol and a parallel element end symbol.

7. A translation machine according to claim 5, wherein said parallel element start symbol is [.

8. A translation machine according to claim 5, wherein said parallel element end symbol is ].

* * * * *